No. 741,728. Patented October 20, 1903.

UNITED STATES PATENT OFFICE.

RUDOLF J. SHIMPER, OF ST. PAUL, MINNESOTA.

FUEL FOR HEATING RAILWAY FREIGHT-CARS, WAREHOUSES, &c.

SPECIFICATION forming part of Letters Patent No. 741,728, dated October 20, 1903.

Application filed September 3, 1901. Serial No. 74,233. (No model.)

*To all whom it may concern:*

Be it known that I, RUDOLF J. SHIMPER, a citizen of the United States, residing at St. Paul, in the county of Ramsey and State of Minnesota, have invented new and useful Improvements in Fuel for Heating Railway Freight-Cars, Warehouses, and other Places; and I do hereby declare that the following is a full, clear, and exact description of my invention and the method of using the same.

Heating freight-cars containing goods of a perishable nature is at present accomplished by wood or coal or oil stoves, all of which methods require the continual services of an attendant on the train, whose neglect may cause the contents of the car to become frozen in transit or spoiled on account of becoming tainted with fumes of burning oil or covered with soot from the oil-stove when it is not properly attended to.

The object of my invention is to provide a sure and safe method of maintaining a constant temperature above the freezing-point in railway freight-cars, warehouses, and other places where perishable goods are stored for a considerable length of time without the constant services of an attendant. I attain this object by the combustion of a slow-burning fuel-briquet, which I burn in a specially-constructed heater, the heat generated therefrom radiating in sufficient intensity to promote circulation of the atmosphere and maintain a temperature above freezing-point.

For ordinary purposes the composition of my briquet consists of the following ingredients, combined in the proportions stated: ground charcoal, two thousand pounds; starch, (potato or rice,) twenty-five pounds; potassium nitrate, one and a half pounds; sodium carbonate, one and a half pounds.

I dissolve the starch with the potassium nitrate and the sodium carbonate in sufficient cold water and then boil the solution with steam for about twenty-five minutes. I then let the hot solution run into a mixer containing the ground charcoal and incorporate the whole into a plastic mass, when it will be ready to be fed into a press and molded into briquets, after which I dry the briquets with artificial heat in the usual manner, and they are then ready for use.

I may use more of the sodium carbonate or more of the potassium nitrate in order to effect speedier combustion; but for general purposes, as before stated, I prefer to use the specified materials in the foregoing proportions.

What I claim, and desire to secure by Letters Patent of the United States, is—

The herein-described composition of matter consisting of charcoal, starch, potassium nitrate and sodium carbonate in the proportions specified to be used as a fuel.

RUDOLF J. SHIMPER.

Witnesses:
L. E. GIBSON,
A. G. MERRILL.